(12) United States Patent
Fink et al.

(10) Patent No.: US 7,739,497 B1
(45) Date of Patent: Jun. 15, 2010

(54) METHOD AND APPARATUS FOR ANONYMOUS IP DATAGRAM EXCHANGE USING DYNAMIC NETWORK ADDRESS TRANSLATION

(75) Inventors: Russell Andrew Fink, Columbia, MD (US); Edward A. Bubnis, Jr., Catonsville, MD (US); Thomas E. Keller, Ellicott City, MD (US)

(73) Assignee: Verizon Corporate Services Group Inc., Basking Ridge, NJ (US)

( * ) Notice: Subject to any disclaimer, the term of this patent is extended or adjusted under 35 U.S.C. 154(b) by 1667 days.

(21) Appl. No.: 10/103,424

(22) Filed: Mar. 21, 2002

Related U.S. Application Data

(60) Provisional application No. 60/277,685, filed on Mar. 21, 2001.

(51) Int. Cl.
*H04L 29/06* (2006.01)
(52) U.S. Cl. .................. 713/162; 713/153; 713/160
(58) Field of Classification Search .................. 713/162, 713/161, 160, 153
See application file for complete search history.

(56) References Cited

U.S. PATENT DOCUMENTS

| | | | | |
|---|---|---|---|---|
| 5,757,924 A | * | 5/1998 | Friedman et al. | 713/151 |
| 5,809,147 A | * | 9/1998 | De Lange et al. | 380/28 |
| 5,872,783 A | * | 2/1999 | Chin | 370/395.32 |
| 5,917,820 A | * | 6/1999 | Rekhter | 370/392 |
| 6,016,319 A | * | 1/2000 | Kshirsagar et al. | 370/410 |
| 6,041,408 A | * | 3/2000 | Nishioka et al. | 713/171 |
| 6,055,236 A | * | 4/2000 | Nessett et al. | 370/389 |
| 6,092,191 A | * | 7/2000 | Shimbo et al. | 713/153 |
| 6,154,839 A | * | 11/2000 | Arrow et al. | 713/154 |
| 6,157,644 A | * | 12/2000 | Bernstein et al. | 370/392 |
| 6,249,820 B1 | * | 6/2001 | Dobbins et al. | 709/238 |
| 6,253,321 B1 | * | 6/2001 | Nikander et al. | 713/160 |
| 6,256,715 B1 | * | 7/2001 | Hansen | 711/163 |
| 6,266,704 B1 | * | 7/2001 | Reed et al. | 709/238 |
| 6,389,533 B1 | * | 5/2002 | Davis et al. | 713/162 |
| 6,397,260 B1 | * | 5/2002 | Wils et al. | 709/238 |
| 6,412,009 B1 | * | 6/2002 | Erickson et al. | 709/228 |
| 6,418,476 B1 | * | 7/2002 | Luciani | 709/238 |
| 6,438,612 B1 | * | 8/2002 | Ylonen et al. | 709/249 |
| 6,473,863 B1 | * | 10/2002 | Genty et al. | 726/3 |
| 6,477,580 B1 | * | 11/2002 | Bowman-Amuah | 709/231 |
| 6,490,292 B1 | * | 12/2002 | Matsuzawa | 370/401 |
| 6,501,767 B1 | * | 12/2002 | Inoue et al. | 370/465 |
| 6,502,135 B1 | * | 12/2002 | Munger et al. | 709/225 |

(Continued)

OTHER PUBLICATIONS

U.S. Appl. No. 09/594,100, filed Jun. 14, 2000, Dean.

(Continued)

*Primary Examiner*—David García Cervetti

(57) ABSTRACT

Methods, apparatus, system and computer program are provided for concealing the identity of a network device transmitting a datagram having a network layer header. A unique local identifier and broadcast address are determined in accordance with a next-hop address. A partially encrypted network layer header is determined by encrypting a plurality of identifying portions of the network layer header, where one portion of the network layer header is the unique local identifier. The datagram is encapsulated with another network layer header whose address is set to the broadcast address. The encapsulated datagram can be received and detunneled, and an address of a recipient can be extracted from the network layer header. The datagram is then admitted into a network domain.

49 Claims, 11 Drawing Sheets

U.S. PATENT DOCUMENTS

| | | | |
|---|---|---|---|
| 6,507,908 B1 * | 1/2003 | Caronni | 713/153 |
| 6,510,154 B1 * | 1/2003 | Mayes et al. | 370/389 |
| 6,526,056 B1 * | 2/2003 | Rekhter et al. | 370/392 |
| 6,535,511 B1 * | 3/2003 | Rao | 370/392 |
| 6,574,214 B1 * | 6/2003 | Khalil et al. | 370/349 |
| 6,603,769 B1 * | 8/2003 | Thubert et al. | 370/401 |
| 6,611,522 B1 * | 8/2003 | Zheng et al. | 370/395.21 |
| 6,640,302 B1 * | 10/2003 | Subramaniam et al. | 713/169 |
| 6,650,621 B1 * | 11/2003 | Maki-Kullas | 370/238 |
| 6,650,641 B1 * | 11/2003 | Albert et al. | 370/392 |
| 6,731,652 B2 * | 5/2004 | Ramfelt et al. | 370/489 |
| 6,751,728 B1 * | 6/2004 | Gunter et al. | 713/153 |
| 6,778,541 B2 * | 8/2004 | Houston et al. | 370/401 |
| 6,798,782 B1 * | 9/2004 | Caronni et al. | 370/409 |
| 6,816,462 B1 * | 11/2004 | Booth et al. | 370/248 |
| 6,832,313 B1 * | 12/2004 | Parker | 713/150 |
| 6,832,314 B1 * | 12/2004 | Irvin | 713/162 |
| 6,839,350 B1 * | 1/2005 | Inouchi et al. | 370/392 |
| 6,857,009 B1 * | 2/2005 | Ferreria et al. | 709/219 |
| 6,870,842 B1 * | 3/2005 | Caronni et al. | 370/390 |
| 6,907,473 B2 * | 6/2005 | Schmidt et al. | 709/248 |
| 6,954,790 B2 * | 10/2005 | Forslow | 709/227 |
| 7,003,118 B1 * | 2/2006 | Yang et al. | 380/287 |
| 7,009,943 B2 * | 3/2006 | O'Neil | 370/260 |
| 7,031,288 B2 * | 4/2006 | Ogier | 370/338 |
| 7,099,324 B2 * | 8/2006 | Kametani | 370/392 |
| 7,107,614 B1 * | 9/2006 | Boden et al. | 726/15 |
| 7,111,163 B1 * | 9/2006 | Haney | 713/153 |
| RE39,360 E * | 10/2006 | Aziz et al. | 713/150 |
| 7,143,192 B2 * | 11/2006 | Tuniman et al. | 709/247 |
| 7,200,146 B2 * | 4/2007 | Khosravi et al. | 370/392 |
| 7,234,059 B1 * | 6/2007 | Beaver et al. | 713/170 |
| 7,266,085 B2 * | 9/2007 | Stine | 370/252 |
| 2001/0023482 A1 * | 9/2001 | Wray | 713/151 |
| 2002/0010799 A1 * | 1/2002 | Kubota et al. | 709/249 |
| 2002/0026525 A1 * | 2/2002 | Armitage | 709/238 |
| 2002/0049902 A1 * | 4/2002 | Rhodes | 713/153 |
| 2002/0069278 A1 * | 6/2002 | Forslow | 709/225 |
| 2002/0085490 A1 * | 7/2002 | O'Neil | 370/229 |
| 2002/0161884 A1 * | 10/2002 | Munger et al. | 709/224 |
| 2002/0161925 A1 * | 10/2002 | Munger et al. | 709/241 |
| 2003/0033394 A1 * | 2/2003 | Stine | 709/222 |
| 2003/0039245 A1 * | 2/2003 | Khosravi et al. | 370/389 |
| 2004/0003116 A1 * | 1/2004 | Munger et al. | 709/245 |
| 2004/0098485 A1 * | 5/2004 | Larson et al. | 709/227 |
| 2006/0123134 A1 * | 6/2006 | Munger et al. | 709/245 |
| 2008/0034201 A1 * | 2/2008 | Munger et al. | 713/153 |
| 2008/0040783 A1 * | 2/2008 | Larson et al. | 726/7 |
| 2008/0040791 A1 * | 2/2008 | Munger et al. | 726/14 |
| 2008/0040792 A1 * | 2/2008 | Larson et al. | 726/14 |

OTHER PUBLICATIONS

U.S. Appl. No. 09/927,671, filed Aug. 10, 2001, Fink et al.
U.S. Appl. No. 09/928,133, filed Aug. 10, 2001, Fink et al.
U.S. Appl. No. 09/927,979, filed Aug. 10, 2001, Fink et al.
Simpson, W., 1853, "IP in IP tunnelling", Request for Comments (RFC) 1853, Oct. 1995.
Martin, D.M., Jr., "Local Anonymity in the Internet", Boston University Graduate School of Arts and Sciences, Dissertation, Iowa State University, 1993.
Ex-KB expert unveils new computer shield,, Reuters, http://www.msnbc.com/news/576522.asp?cp1=1, 5 pages.

* cited by examiner

| Ver. | IHL | TOS | Total Length | | Source Port | Destination Port |
|---|---|---|---|---|---|---|
| Identification | | | Flags | Fragment Offset | Sequence Number | |
| Time to Live | | Protocol | Header Checksum | | Acknowledgement Number | |
| Source Network Address | | | | | Offset | Reserved | (Bits) | Window |
| Destination Network Address | | | | | Checksum | Urgent Pointer |
| Options + Padding | | | | | Options + Padding | |

(Labels along left side: I P / T C P)

PRIOR ART

FIGURE 1

METHOD AND APPARATUS FOR ANONYMOUS IP DATAGRAM EXCHANGE USING DYNAMIC NETWORK ADDRESS TRANSLATION

REFERENCE TO EARLIER FILED APPLICATION

This application claims the benefit of U.S. Provisional Application No. 60/277,685 filed Mar. 21, 2001.

STATEMENT OF GOVERNMENT INTEREST

The present invention was made with government support under Contract No. N66001-00-D-8041, awarded by the Defense Advanced Research Projects Agency (DARPA). The government has certain rights in the invention.

BACKGROUND OF THE INVENTION

1. Field of the Invention

The present invention relates generally to the field of network communication systems and, more particularly to security systems for use with network communication systems.

2. Related Art

A set of inter-connected computer networks that spans a relatively large geographical area is called a wide area network (WAN). Typically, a WAN consists of two or more local-area networks (LANs) that are themselves interconnected. Computers connected to a WAN are often connected through public networks, such as the telephone system. They can also be connected through leased lines or satellites. The largest and best known WAN in existence is the Internet.

The Internet is a public, world-wide WAN defined by the Internet Protocol (IP) suite of protocols, which has in recent years gone from being a tool used primarily in scientific and military fields to become an important part of the missions of a wide variety of organizations, including commercial organizations. Organizations often run one or more LANs and connect their LANs to the Internet to share information with other remotely located organization-run LAN, and with the cyber world in general. However, along with providing new levels of connectivity and sources of information, connection to the Internet or to a private WAN has brought security risks in the form of adversaries seeking to disrupt or infiltrate the organization's mission by interfering with or monitoring the organizations' networks.

Several security devices that exist today are designed to keep external adversaries from obtaining access to a LAN. Firewalls, for example, protect the LAN against unauthorized access by allowing only communications data (commonly called datagrams or "packets") from known machines to pass. This is accomplished by monitoring network IP addresses on these packets, which correspond uniquely to a particular machine, and Transmission Control Protocol (TCP) service ports, which usually map into a specific type of software application such as mail, ftp, http and the like. The firewall then determines whether to allow or disallow entry of the packet into the LAN as it deems appropriate.

Virtual Private Network (VPN) and other Internet Protocol Security (IPsec) devices protect against unauthorized interception of transmitted data by encrypting the entire packet. For example, a VPN (in tunnel mode) wraps outgoing datagrams with its own header and sends the encrypted packet to a destination VPN. A limitation of VPNs, however, is that adversaries can determine where the VPN devices are located in the network, since each VPN has a specific IP address. Accordingly, a VPN does not hide its location in the network, and is therefore vulnerable to an attack once its location is known. Similarly, other security technology, such as configured routers, Secure Socket Layer (SSL) and host-based IPsec fail to obscure the location of nodes inside a network.

Although conventional security techniques are generally good for some of their intended purposes, they do not address the problem of detecting intrusion attempts against the network. To alert against possible intrusion attempts, network administrators have turned to intrusion detection sensing (IDS) technology. IDS technology is used to ascertain the level of adversary activity on the LAN and to monitor the effectiveness of other security devices, such as those discussed above. IDS products work by looking for patterns of known attack, including network probes, specific sequences of packets representing attacks (called known intrusion patterns, or KIPs), and the like. An administrator uses IDS technology primarily to determine the occurrence of any adversarial activity, information useful in evaluating the effectiveness of current security technology and justifying additional commitment to network security.

In addition to protecting transmitted data, an organization may wish to prevent unauthorized parties from knowing the topology of their LANs. Existing security techniques do not completely secure a network from adversaries who employ traffic mapping analysis. Data packets exchanged across networks carry not only critical application data, but also contain information that can be used to identify machines involved in the transactions.

Today's sophisticated adversaries employ network-level "sniffers" to monitor passively freely transmitted network traffic and thereby gather critical network topology information, including the identities of machines sending and receiving data and the intermediate security devices that forward the data. The sophisticated adversary can use this identity information to map internal network topologies and identify critical elements such as: roles of the servers, clients and security devices on the network, classes of data associated with specific servers, and relative mission importance of specific machines based on network traffic load. The adversary can then use this network map information to plan a well-structured, network-based attack.

Network security techniques have been developed that addresses this problem by concealing the identities of machines and topology in the LAN. Such technology was developed by the assignee of the present application, and is described in U.S. patent application Ser. No. 09/594,100, entitled Method and Apparatus for Dynamic Mapping U.S. Pat. No. 7,042,633, entitled Method and Apparatus for Providing Adaptive Self-Synchronized Dynamic Address Translation (ASD), Ser. No. 09/928,133, entitled Method And Apparatus For Providing Adaptive Self-Synchronized Dynamic Address Translation As An Intrusion Detection Sensor, and U.S. Pat. No. 6,826,684, entitled Sliding Scale Adaptive Self-Synchronized Dynamic Address Translation, each of which is hereby incorporated by reference.

Both the Dynamic Network Address Translation (DYNAT) and Adaptive Self-Synchronized Dynamic Network Address Translation (ASD) techniques can hide machine identities on, for example, IP data packets, by translating source and destination addresses just prior to transmitting them over the Internet. When packets arrive at an authorized destination, a receiving device programmed with the techniques restores the source and destination addresses (according to a negotiated scheme) and forwards the packets to the appropriate host on its LAN.

These techniques can perform direct translation of specific fields in the IP portion of the packet as well as in the transport/session layer. The specific fields are summarized in FIG. 1. Thus, it can be seen that these techniques obfuscate the identities in routable packets.

While the above techniques represent a significant advancement in the field of network security, there exists a need for a method of concealing the identities of LAN machines and topology. There also exists a need for methodologies that thwart address-based traffic analytic attacks within the local subnet. This additional security would make existing network security systems more robust and more difficult to defeat. The technique should ideally allow for construction of network access devices, such as routers, that offer the benefits of DYNAT and ASD to protect an enclave of computers. In addition, these devices should be flexible enough to be self-discovering, able to negotiate mapping parameters with one another on a need-based, authorized basis.

SUMMARY OF THE INVENTION

Accordingly, it is an object of this invention to drive up an adversary's cost of analyzing network traffic.

It is also an object of this invention to drive up the complexity of analyzing network traffic.

It is further an object of this invention to improve the DYNAT and ASD techniques by protecting sender/recipient identities.

It is a further object of the invention to protect host-level identities, negating a wide-range of address/port-based attacks.

Yet another object of the invention is to be able to trigger intrusion detectors.

Another object of the invention is to be able to be deployed in "the last hop" of the network in a local host collision domain.

It is yet another object of the invention to be compatible with firewalls.

It is also an object of the invention to be compatible with additional security techniques that protect packet payloads.

Another object of the invention is to be impervious to fragmentation.

Yet another object of the present invention is to be application-layer independent.

In accordance with the teachings of the present invention, these and other objects may be accomplished by the present invention, which is a method, apparatus, computer program, and system for concealing the identity of a network device transmitting a datagram having a network layer header.

One embodiment includes determining a unique local identifier in accordance with a next-hop address, generating a broadcast address in accordance with the next-hop address, creating a partially encrypted network layer header by encrypting a plurality of identifying portions of the network layer header, wherein one portion of the network layer header is the unique local identifier, and encapsulating the datagram with another network layer header whose address is set to the broadcast address. A method is also provided for receiving and detunneling the encapsulated datagram, extracting an address of a recipient from the network layer header, and admitting the datagram into a network domain.

Another embodiment of the present invention is an apparatus for concealing the identity of a network device transmitting a datagram having a network layer header. This embodiment includes a processor including processing circuitry configured to determine a unique local identifier in accordance with a next-hop address, generate a broadcast address in accordance with the next-hop address, and create a partially encrypted network layer header by encrypting a plurality of identifying portions of the network layer header, where one portion of the network layer header is the unique local identifier. The processor is further adapted to encapsulate the datagram with another network layer header whose address is set to the broadcast address.

Yet another embodiment includes an apparatus for forwarding a datagram having a network layer header. The apparatus includes a transceiver adapted to receive an encapsulated datagram from a network device. The apparatus further includes a processor including processing circuitry configured to detunnel the encapsulated datagram, extract an address from the network layer header, and admit the datagram into a network domain. The network device is adapted to determine a unique local identifier in accordance with a next-hop address, generate a broadcast address in accordance with the next-hop address, and create a partially encrypted network layer header by encrypting a plurality of identifying portions of the network layer header, where one portion of the network layer header is the unique local identifier. The network device is further adapted to encapsulate the datagram with another network layer header whose address is set to the broadcast address, and transmit the encapsulated datagram.

Another embodiment of the present invention is an apparatus for concealing the identity of a network device transmitting a datagram having a network layer header, including means for determining a unique local identifier in accordance with a next-hop address, means for generating a broadcast address in accordance with the next-hop address, means for creating a partially encrypted network layer header by encrypting a plurality of identifying portions of the network layer header, where one portion of the network layer header is the unique local identifier, and means for encapsulating the datagram with another network layer header whose address is set to the broadcast address.

Yet another embodiment of the present invention is an apparatus for forwarding a datagram having a network layer header. This apparatus includes means for receiving and detunneling an encapsulated datagram from a network device, means for extracting an address from the network layer header, and means for admitting the datagram into a network domain. The network device is adapted to determine a unique local identifier in accordance with a next-hop address, generate a broadcast address in accordance with the next-hop address, and create a partially encrypted network layer header by encrypting a plurality of identifying portions of the network layer header, where one portion of the network layer header is the unique local identifier. The network device is further adapted to encapsulate the datagram with another network layer header whose address is set to the broadcast address, and transmit the encapsulated datagram.

Another embodiment of the present invention is a computer program, for concealing the identity of a network device transmitting a datagram having a network layer header, operable to determine a unique local identifier in accordance with a next-hop address, generate a broadcast address in accordance with the next-hop address, and create a partially encrypted network layer header by encrypting a plurality of identifying portions of the network layer header, where one portion of the network layer header is the unique local identifier the network device is further adapted to encapsulate the datagram with another network layer header whose address is set to the broadcast address.

Another embodiment of the present invention is a computer program, for forwarding a datagram having a network layer header, operable to receive and detunnel an encapsulated datagram from a network device, extract an address from the network layer header, and admit the datagram into a network domain. The network device is adapted to determine a unique local identifier in accordance with a next-hop address, generate a broadcast address in accordance with the next-hop address, and create a partially encrypted network layer header by encrypting a plurality of identifying portions of the network layer header, where one portion of the network layer header is the unique local identifier. The network device is further adapted to encapsulate the datagram with another network layer header whose address is set to the broadcast address, and transmit the encapsulated datagram.

Yet another embodiment of the present invention is a system for concealing the identity of a network device transmitting a datagram having a network layer header. The system includes a first processor adapted to determine a unique local identifier in accordance with a next-hop address, generate a broadcast address in accordance with the next-hop address, and create a partially encrypted network layer header by encrypting a plurality of identifying portions of the network layer header, where one portion of the network layer header is the unique local identifier. the network device is further adapted to encapsulate the datagram with another network layer header whose address is set to the broadcast address. The system further includes a first transceiver electrically coupled to the first processor, adapted to transmit and receive the encapsulated datagram. A second transceiver is adapted to receive the encapsulated datagram, and a second processor, electrically coupled to the second transceiver, is adapted to detunnel the encapsulated datagram, extract an address from the network layer header, and admit the datagram into a network domain via the second transceiver.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The present invention will be described from the following detailed description of preferred embodiments in conjunction with the accompanying drawings, in which:

FIG. 1 is a table of a TCP/IP datagram, showing in bold the obfuscated fields in accordance with an embodiment of the prior art;

DETAILED DESCRIPTION OF THE INVENTION

Applicants have previously invented a method of translating source and destination address and packet identifier information which remaps machine source and destination addresses and packet identifier information, thereby changing the network appearance to adversaries outside a DYNAT or ASD-protected enclave. The present invention makes the above-mentioned techniques even more robust. In particular, Applicants have invented a method that takes a datagram upon which the DYNAT or ASD techniques have been performed and then wraps that datagram inside another routable datagram. This new concept, which may be referred to for the sake of convenience as Anonymous Unicast Dynamic Network Address Translation (AUD), sets the destination address of the enclosing header to the broadcast address of the recipient's subnet, thereby preventing sniffers in the local collision domain from detecting the intended recipient of the datagram.

It should be noted that while the present invention will be described in the context of the Internet and the TCP/IP version 4 suite of protocols, it is not limited as such. To the contrary, the invention could be used for other protocols such as, for example, Asynchronous Transfer Mode, Token Ring, Frame Relay, IPv6, cellular digital packet data (CDPD), Internet control message protocol (ICMP), Internet group management protocol (IGMP) and, more generally, other entity address-based protocols for wireline or wireless communications. Each of these protocols contains header parameters, relating to a machine's location in the network that could be translated, thereby providing obfuscation of the network topology.

Figure 2:
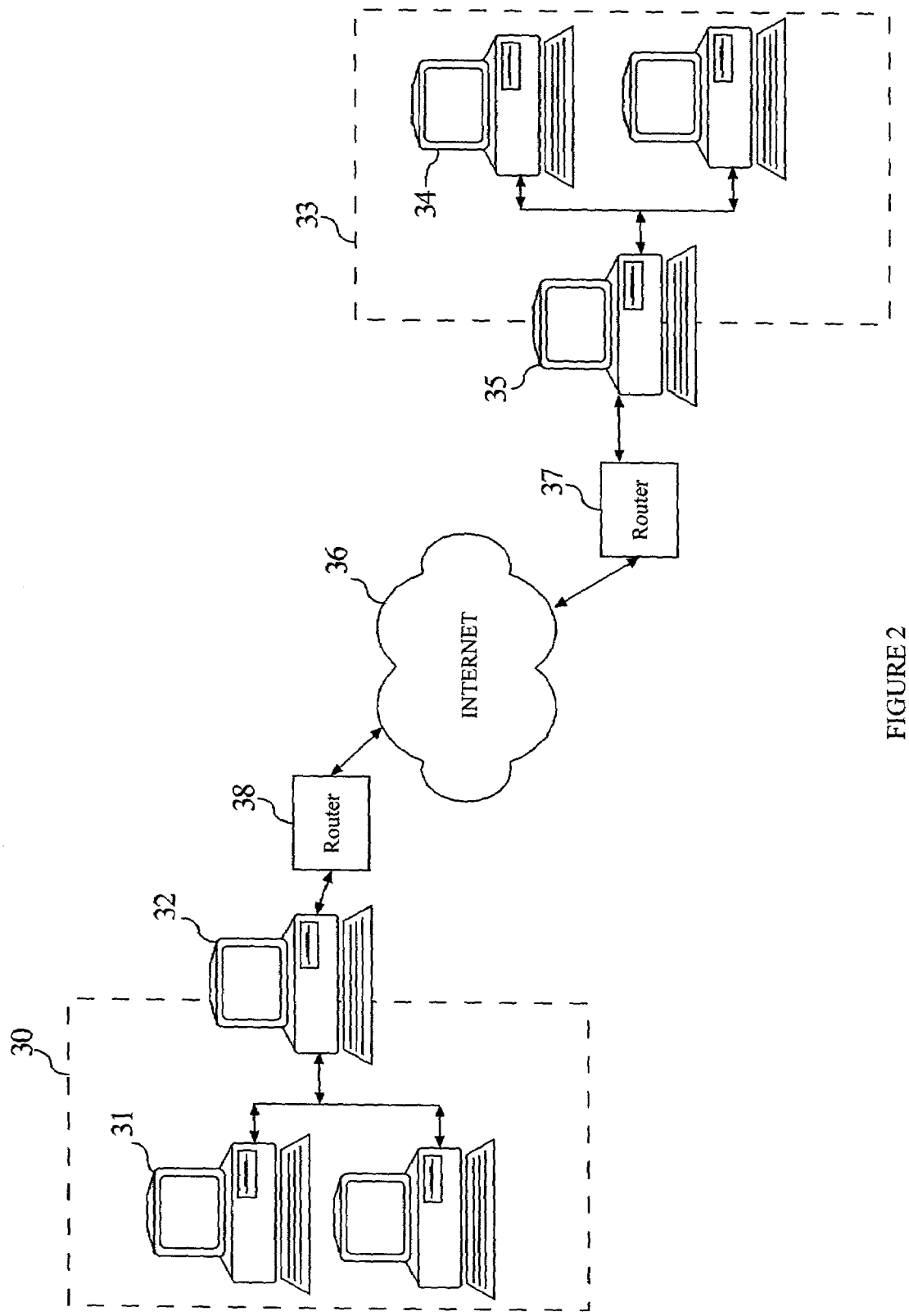
FIG. 2 is a diagram of a network system in accordance with the subject invention.

A preferred embodiment of the AUD technique of the present invention will now be described with reference to FIGS. 2 through 10. FIG. 2 is a block diagram of a network including enclaves 30, 33 of local sending and receiving hosts 31, 34, respectively, connected to the Internet 36. A bastion host computer, hereinafter referred to as a sending peer 32 or receiving peer 35, is a gateway between an inside network and an outside network. Conventional routers 38, 37 are coupled to the peers 32, 35 and connect the enclaves 30, 33 to the Internet 36. A private WAN can also be connected between the enclaves. An exemplary embodiment of the present invention can be implemented in a host, such as in the form of a network-card or a bump-in-the-wire intercept device, and in the routers 38, 37. Such cards and devices should include a transceiver having transmitting and receiving circuitry, for transmitting and receiving packets. The cards or devices should also include memory for storing program code and data, as well as some form of microprocessor, computer chip, or the like including circuitry for running the program code. The implementation preferably includes processes for setup, packet-receipt, packet reply, proxy mode, and unsolicited-send scenarios.

Figure 3:
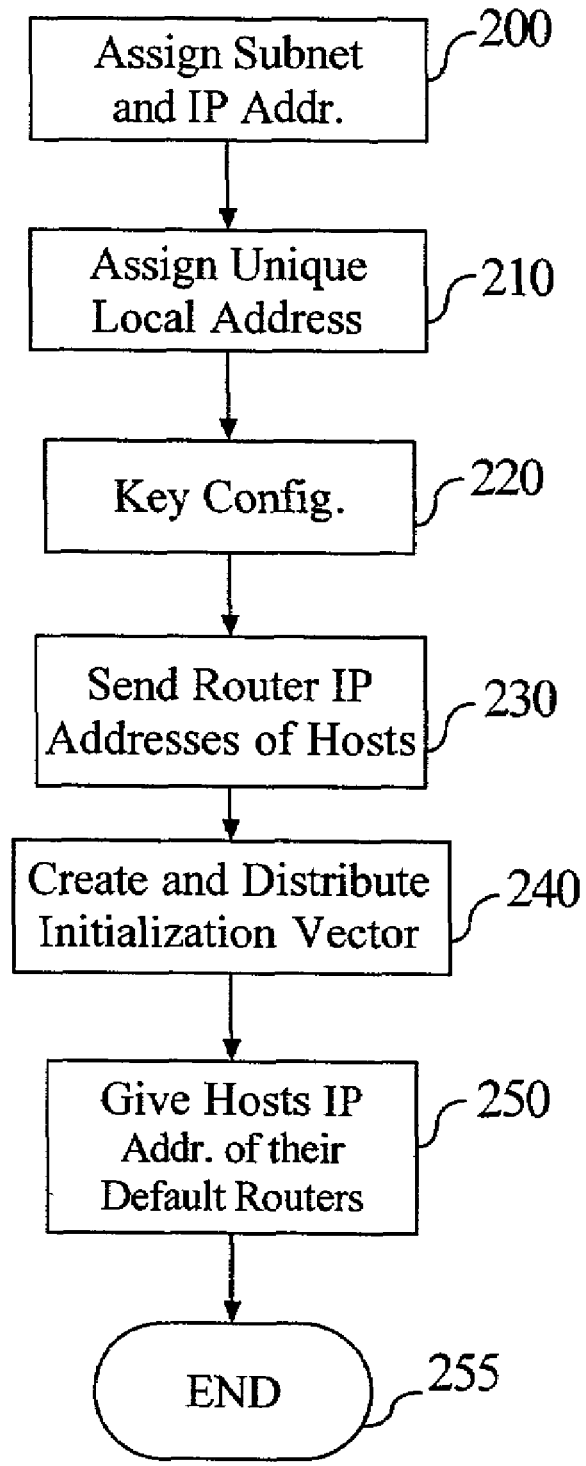
FIG. 3 is a flowchart showing steps for the setup process in accordance with the subject invention.

The setup process will now be described with reference to FIG. 3. In step 200, the host and router are assigned to designated subnets and given true IP addresses (one IP address per network interface for a router). These can be non-routable addresses, as long as they are unique on the domain to which their interface is connected. In step 210, each network interface is assigned a unique local address. This unique identifier is simply the IP address for IPv4, or can be the EUI64/MAC address for IPv6.

Next, in step 220, the hosts' network cards are configured with the other hosts' keys in the local AUD domain, as well as the AUD router's key corresponding to the network interface connected to the local domain. Preferably the key can be asymmetric certificate style public keys, or a common group key. The AUD technique does not rely on any specific style of keys; it only requires that one exist.

Next, the router is given the hosts' keys, and keys are indexed by the unique local address of each host, shown at step 230. The router is given beforehand a list of true IP addresses of the hosts. Additionally, AUD routers external interface is configured with the knowledge of the subnet, and similarly with keys and subnets of adjacent peer AUD routers.

In step 240, a unique random initialization vector (i.e., a large number) is created for each host and the router, and distributed to the hosts for use as an index counter to control encryption properties and to reduce the likelihood of collisions. A conventional pseudo random number generator (PRNG) can be used create the vector.

In step 250, the hosts are given the IP address of their default AUD router. Each host in an AUD domain is configured with a "default route", specifically, the address of an AUD router connected into its local collision domain. A default route is a path along which packets with unknown addresses are sent by default. Similarly, an AUD-enabled host preferably has a default location in which to send packets that are not intended for a host in the local collision domain. Several "default" routers may be used in accordance with the present invention. This scheme could be used to handle failover, redirection, or other backup operation, for example. Step 255 is an end step.

Figure 4:
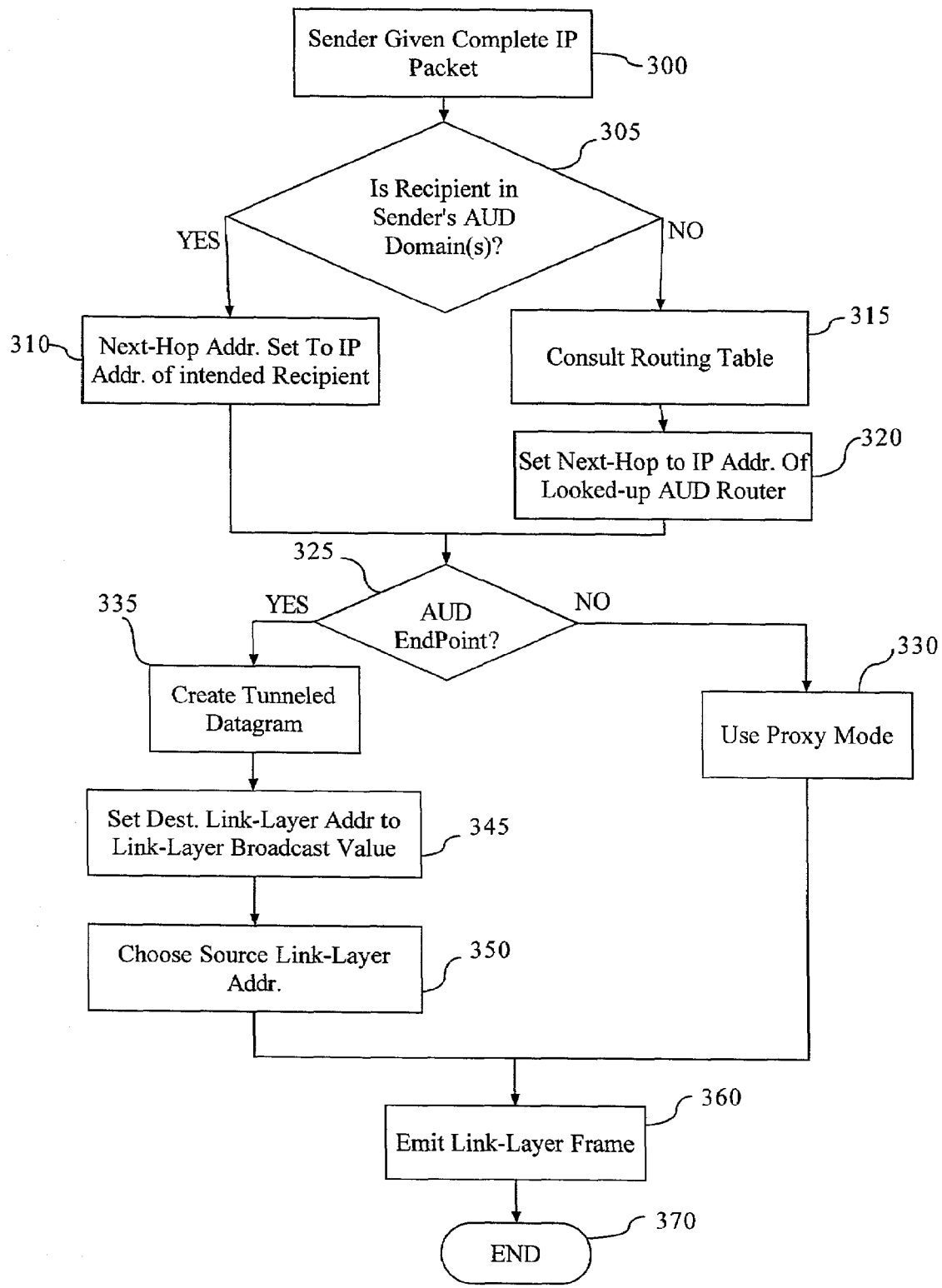
FIG. 4 is a flowchart showing steps for sending a packet from one host to another in accordance with the subject invention.

A process for sending a packet from one host to another will now be described with reference to FIG. 4. More particularly, this scenario describes how a host in an AUD domain sends a packet either to the outside world or to another host on the local domain. It should be noted that a sender may have access to more than one local AUD domain, such as in the case of AUD routers.

In step 300, the sender is given a complete IP packet with the true recipient IP address specified. The sender receives this packet from its upper-level IP software. Next, in step 305, a "next-hop address" is determined, i.e., the next hop a packet will visit in a string of connections between two network devices. If the recipient is in the sender's AUD domain(s), i.e., the recipient subnet matches one of the sender's subnets, then the next-hop address is set to the IP address of the intended recipient, as shown in step 310. If the recipient is not in any of the sender's AUD domains, then a routing table is consulted to look up the IP address of the AUD router that handles the recipient's subnet, as shown in step 315; and at step 320, the next-hop address is set to the IP address of the looked-up AUD router. Preferably, the routing table applies to AUD routers and is a lookup table of packet subnets to interfaces (i.e., the interface to which packets that match a particular subnet are sent to). The next-hop address can be a multicast address, one that is established for the purpose of multiple AUD routers in separate networking domains to communicate packets anonymously.

If it is determined at step 325 that the recipient is not an AUD endpoint, e.g., yahoo.com, then this procedure is aborted, and proxy mode is used, as shown in step 330. Proxy mode is described in more detail below.

With regard to routing tables and proxying, preferably the end-point hosts always have a default AUD router for all non-local traffic, whether the destination specifies an AUD or a non-AUD host. That is, the AUD router is the only device that should be proxying, and ideally, only the AUD router sits on the edge of the enclave.

If it is determined at step 325 that the recipient is an AUD endpoint, then the tunneled datagram is created, as shown in step 335. The creation of a tunneled datagram is described in detail below.

Next the sender creates a link-layer frame to contain the tunneled datagram. The destination link-layer address is set to the link-layer broadcast value, and the source link-layer address is chosen per the link-layer addressing description, as shown in steps 345 and 350, respectively. This technique provides sender anonymity at the link layer.

At step 360, the sender emits the link-layer frame (with datagram) on the network interface that matches the next-hop address. In one of the various paranoid modes (described in more detail below) the emission of the frame may be on a time-controlled basis, or other basis for use with a variety of "full pipe" traffic whitening techniques. Whitening techniques attempt to smooth out the emission of packets (i.e., control the "burstiness" of data), at the cost of artificial latency, to defeat various timing detection analyses. Step 370 is an end step.

Figure 5A:
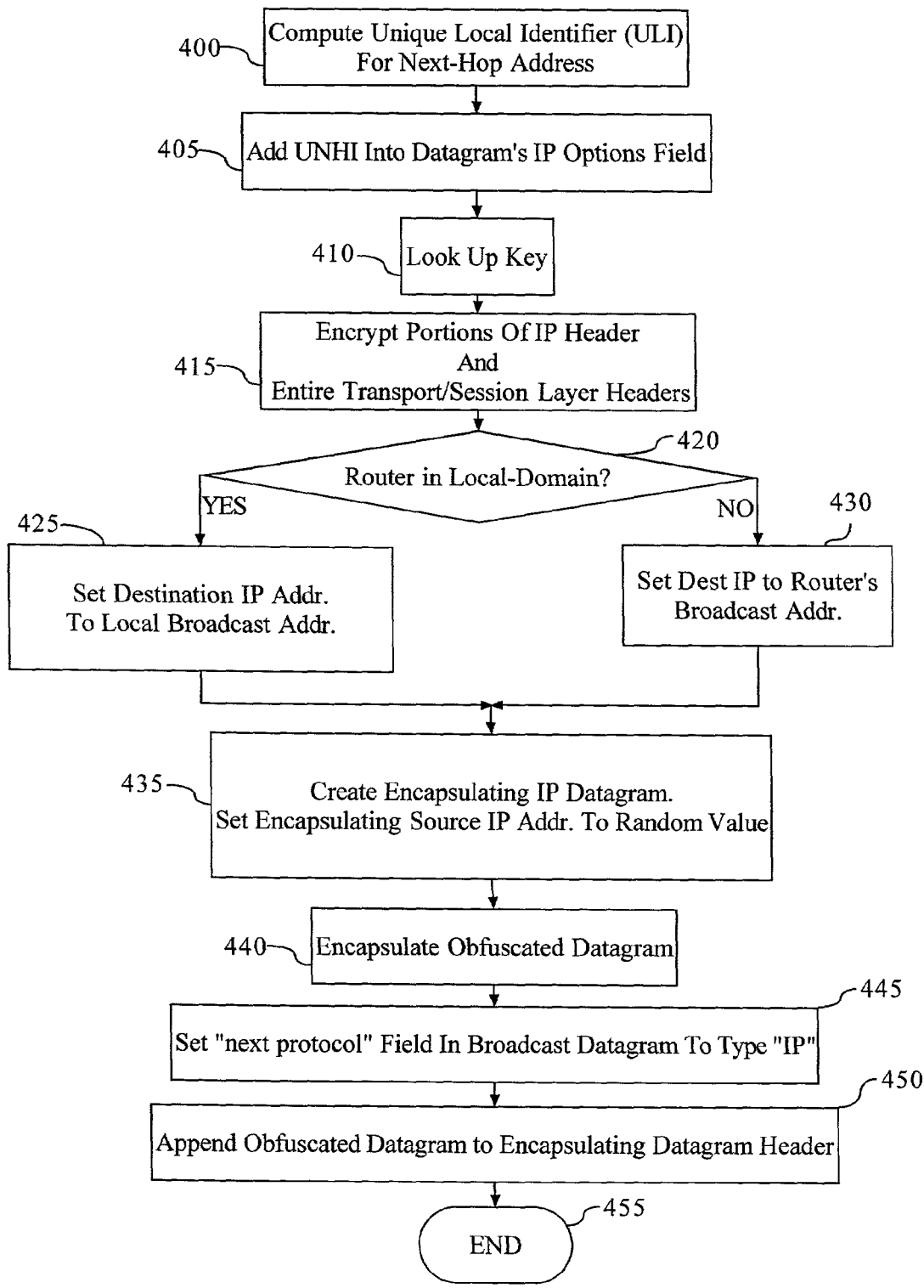
FIG. 5A is a flowchart showing steps for creating a tunneled datagram in accordance with the subject invention.
Figure 5B:
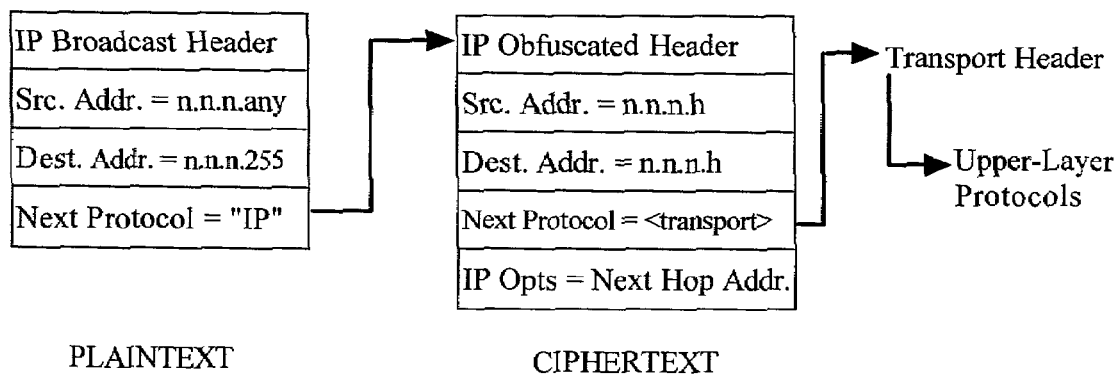
FIG. 5B illustrates an IP-in-IP packet structure used in accordance with the subject invention.

The creation of a tunneled datagram will now be described with reference to FIGS. 5A and 5B. This procedure requires an original IP datagram with the recipient IP address specified in the header and the next-hop address as specified in the preceding paragraph.

Tunneled datagram creation begins at step 400 by computing a unique local identifier (such as one that is 64 bits long) for the next-hop address. For IPv4 networks, this is simply the 32-bit IP address of the next-hop prepended by zeros. For IPv6 networks, this is the 64-bit extended unique identifier (EUI) media access control (MAC) address. In step 405, the sender adds the unique next-hop identifier (UNHI) into the original datagram's IP options field. If other options exist, the UNHI is added to the end of the other options.

Next, the sender looks up the appropriate encryption key using the unique next-hop identifier, as shown in step 410. In step 415, the sender encrypts portions of the original IP header (including the IP source and destination addresses, IP identification number, TTL (time to live), and IP options fields, and the entire transport/session layer headers using the looked-up key. The resulting network layer header is hereinafter called the obfuscated datagram header.

A determination is made at step 420, whether the recipient is in the sender's AUD domain. If the recipient is in the sender's AUD domain, then at step 425, the sender determines the destination IP address to be the broadcast address for the next-hop subnet. For example, if the sender has an IP address of 128.33.11.150, and the recipient address is 128.33.11.161, then the new IP datagram is addressed to 128.33.11.255 (assuming IPv4 class-C is used). This result is hereinafter called the broadcast datagram. Similarly, the IPv6 multicast address would be used if running over IPv6 networks. If the recipient is not in the sender's AUD domain, the sender determines the destination IP address to be the broadcast address for the next-hop subnet. For example if the sender has an IP address of 128.33.11.150, and the recipient address is 207.123.169.100, and the default AUD router's address is 128.33.11.1, then the new IP datagram is addressed to 128.33.11.255. Note that the encrypted IP address would be set to 207.123.169.100, and the encrypted identifier would be 128.33.11.1 to indicate a forwarding operation.

If, on the other hand, the default AUD router is non-local (at the far side of the Internet, for example), then the broadcast address would appear different than for traffic destined locally. For example, if the sending host's IP address is 128.33.11.150, and the AUD router has an address of 207.123.169.100, then the broadcast address 207.123.169.255 would be used, as that is the broadcast of the AUD router's interface, as shown at step 430.

At step 435, the sender creates the encapsulating datagram, sets the encapsulating source IP address to a completely random value that makes sense for the subnet, and then in step 440 encapsulates the obfuscated datagram in the encapsulating datagram with the broadcast address by using IP-in-IP encapsulation. The IP-in-IP encapsulation technique is known to those skilled in the art, and described for example in Simpson, W., 1853, "IP in IP Tunneling", *Request For Comments (RFC)* 1853, October 1995.

Next, at step 445, the "next protocol" field in the broadcast datagram is set to type "IP", and at step 450 the obfuscated datagram is appended to the encapsulating datagram header. Step 455 is an end step. In summary, the IP-in-IP packet structure used for AUD is shown in the FIG. 5B.

Figure 6:
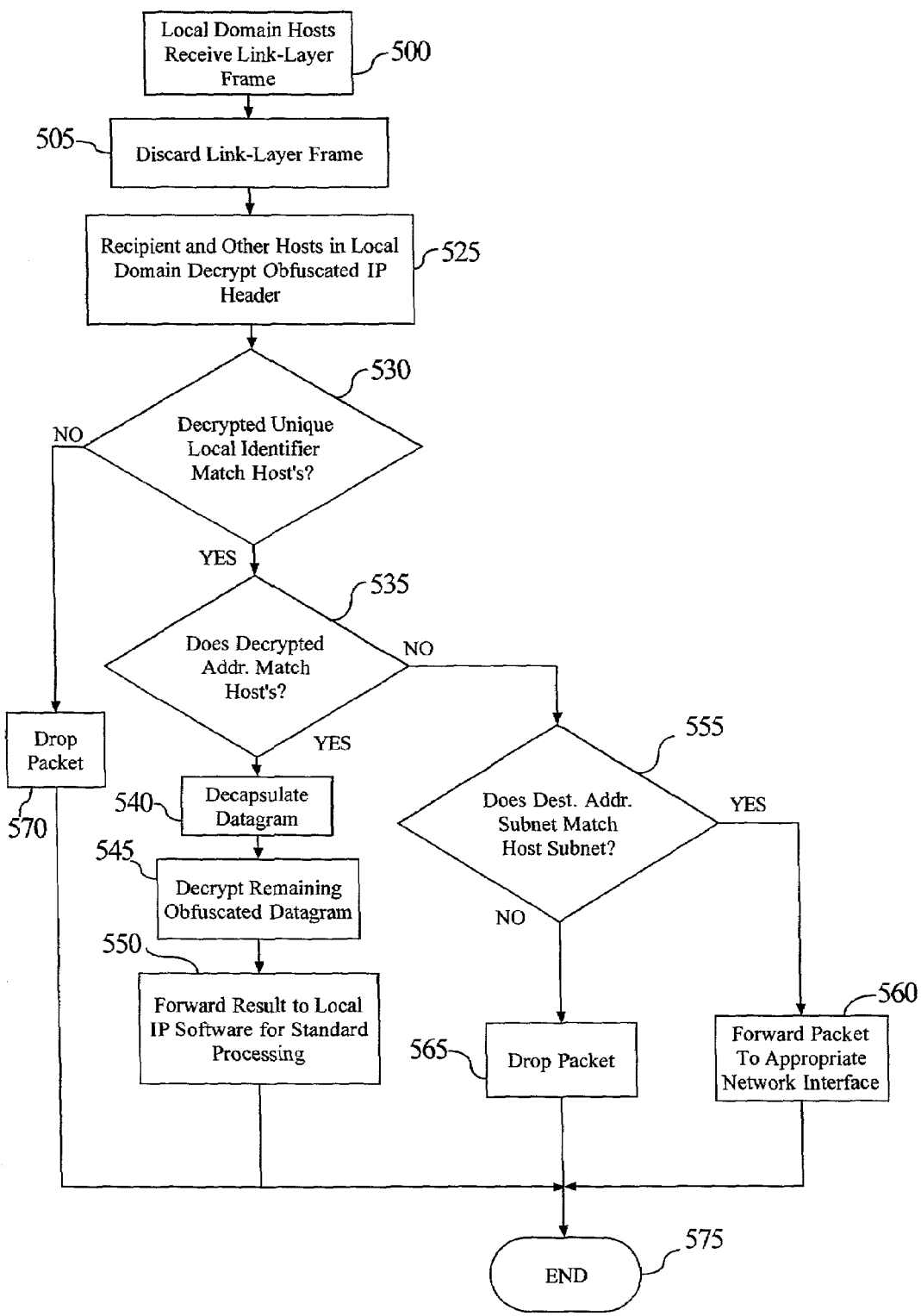
FIG. 6 is a flowchart showing steps for receiving a packet in accordance with the subject invention.

Packet reception will now be described with reference to FIG. 6. As shown in step 500, all the hosts in the local domain receive a link-layer frame (including the sender), having a broadcast IP header followed by an obfuscated IP datagram as described above in the packet send scenario.

In link-layer technologies that utilize a sender address, such as Ethernet, the sender may recognize the link-layer source address as one it chose. In the preferred mode, the sender will choose to discard the link-layer frame, as shown in step 505. An alternative is to ignore the sender address and have every host—including the sender—decrypt the obfuscated IP address and check if the packet is meant for itself, or another host.

Next, at step 525, the recipient and other hosts in the local domain decrypt the obfuscated IP header using their individual keys. The sender obtains the recipient's key, and encrypts data using that key. When the recipient receives the packet, it knows its own key, so it uses that to decrypt the data. There are differences depending on whether symmetric or asymmetric keys are used. In the first case, the same key is used for encryption and decryption, and in the latter case the public key is used for encryption and a private key is used for decryption. As mentioned above, either symmetric or asymmetric encryption can be used in the present invention.

The following actions are taken next. Each host makes a determination whether the decrypted IP header address matches its true IP address and if the decrypted unique local identifier in the IP options field matches its unique local identifier, as shown at steps 535 and 530, respectively. If both the IP header address and unique local identifier match, the host concludes it is the intended recipient. The host decapsulates the datagram, decrypts the rest of the obfuscated datagram, and forwards it to its local IP software for standard processing, as shown at steps 540, 545 and 550, respectively. Such forwarding may include sending a reply, discussed in more detail below, or can include further routing to an exterior network, such as would be done by the AUD router on receipt of an out-bound packet.

If the determinations at steps 530 and 535 determine that the decrypted unique local identifier matches the host's unique local identifier, and the decrypted IP header address does not match its true IP address, then the flow continues to step 555. Step 555 makes a determination whether the subnet of the destination address matches a subnet that the host is connected to. If so, then the host forwards the packet onto the appropriate network interface, as shown in step 560. If the network interface that received the packet is also the interface for forwarding the packet, the host can choose to drop the packet and prevent internal forwarding. That host then follows the above-mentioned packet sending procedure to forward the packet on the proper network interface.

If a determination at step 530 determines that the decrypted unique local identifier does not match that of the host, then at step 570 the packet is dropped (i.e., packet is not intended for that host). A packet is also dropped if the destination address subnet does not match the host subnet, as shown in steps 555 and 565. Step 575 is an end step.

Figure 7:
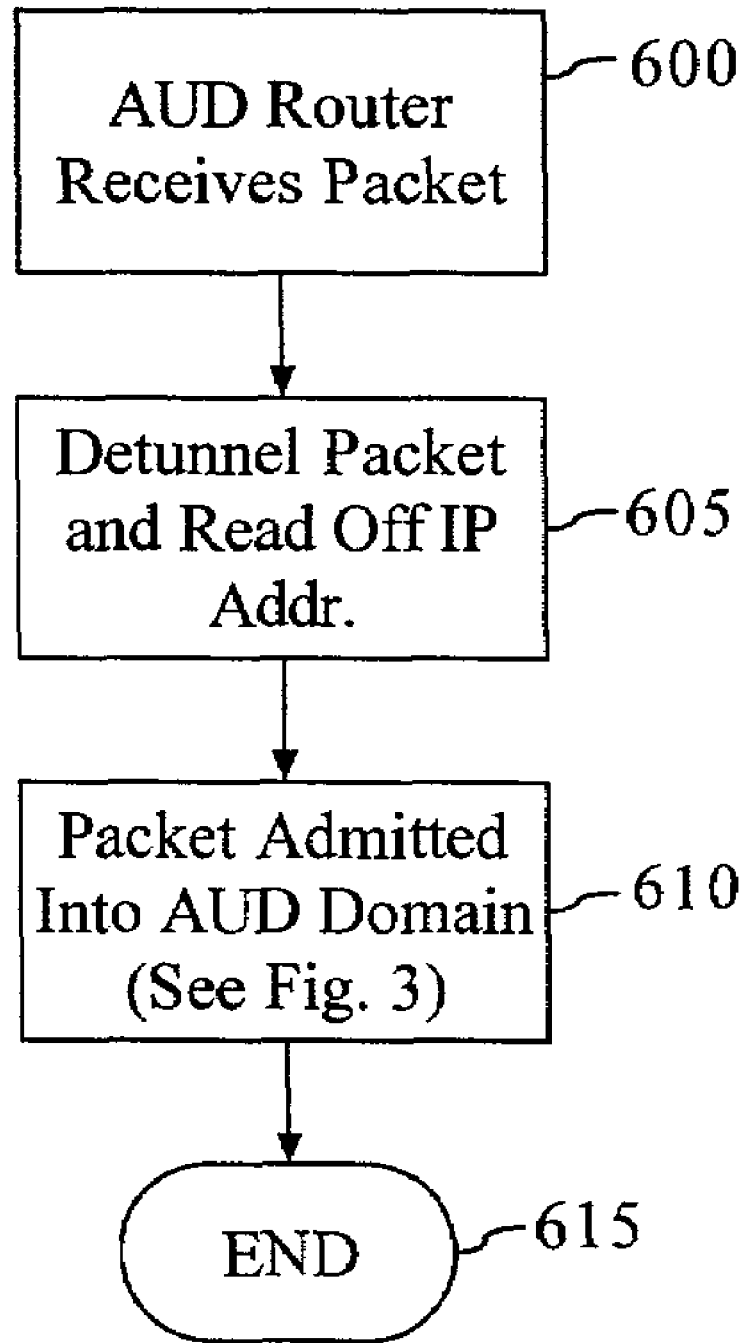
FIG. 7 is a flowchart showing steps for receiving an inbound packet from a remote machine in accordance with the subject invention.

A process for receiving an inbound packet from a remote domain will now be described with reference to FIG. 7. This scenario describes how an inbound packet is distributed anonymously within the local AUD domain, while protecting the identity of the recipient. As shown in step 600, first, the local AUD router receives a packet from the outside destined to a host inside the AUD domain. Next, in step 605, the AUD router detunnels the packet, and extracts the IP address of the intended recipient. It can also determine which of many local domains the IP address belongs to, allowing the AUD to support multiple, physically distinct local collision domains. In step 610, the packet is admitted into the AUD domain per description in the packet send scenario discussed above. Step 615 is an end step.

Figure 8:
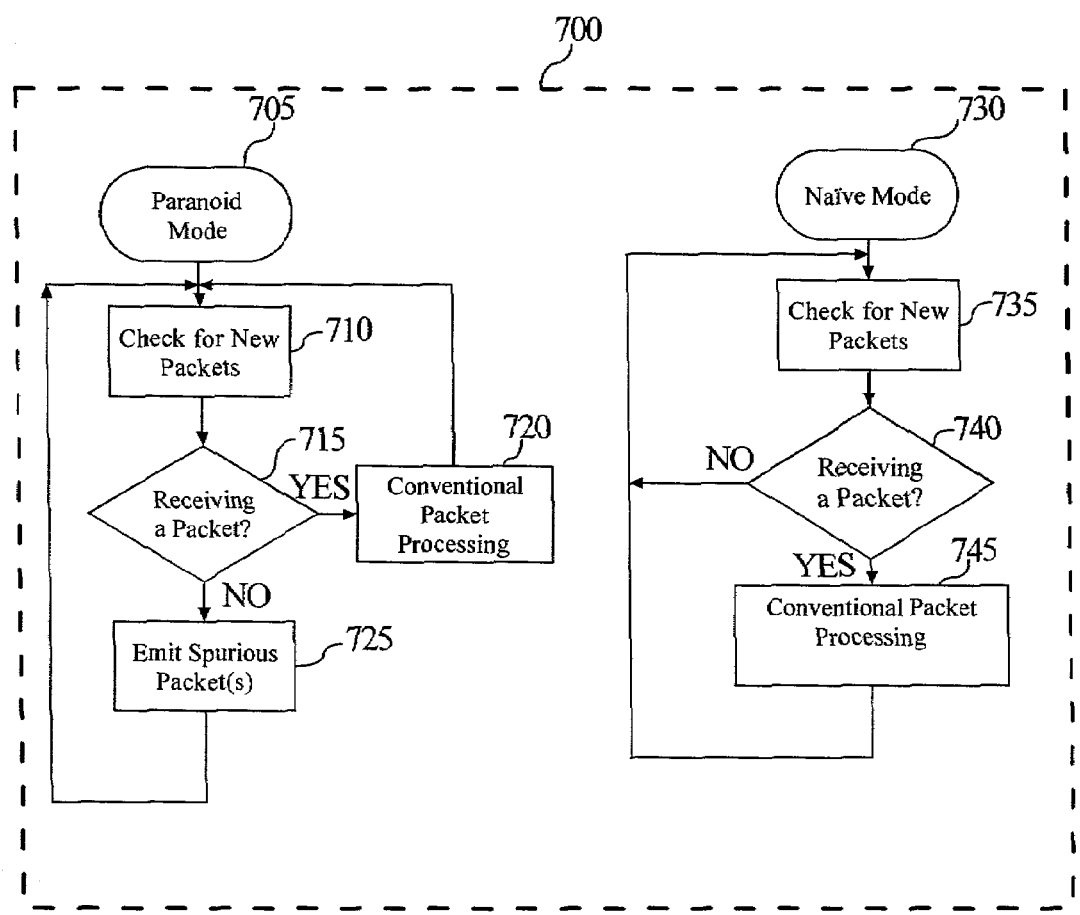
FIG. 8 is a flowchart showing a steady state operation in accordance with the subject invention.
Figure 10:
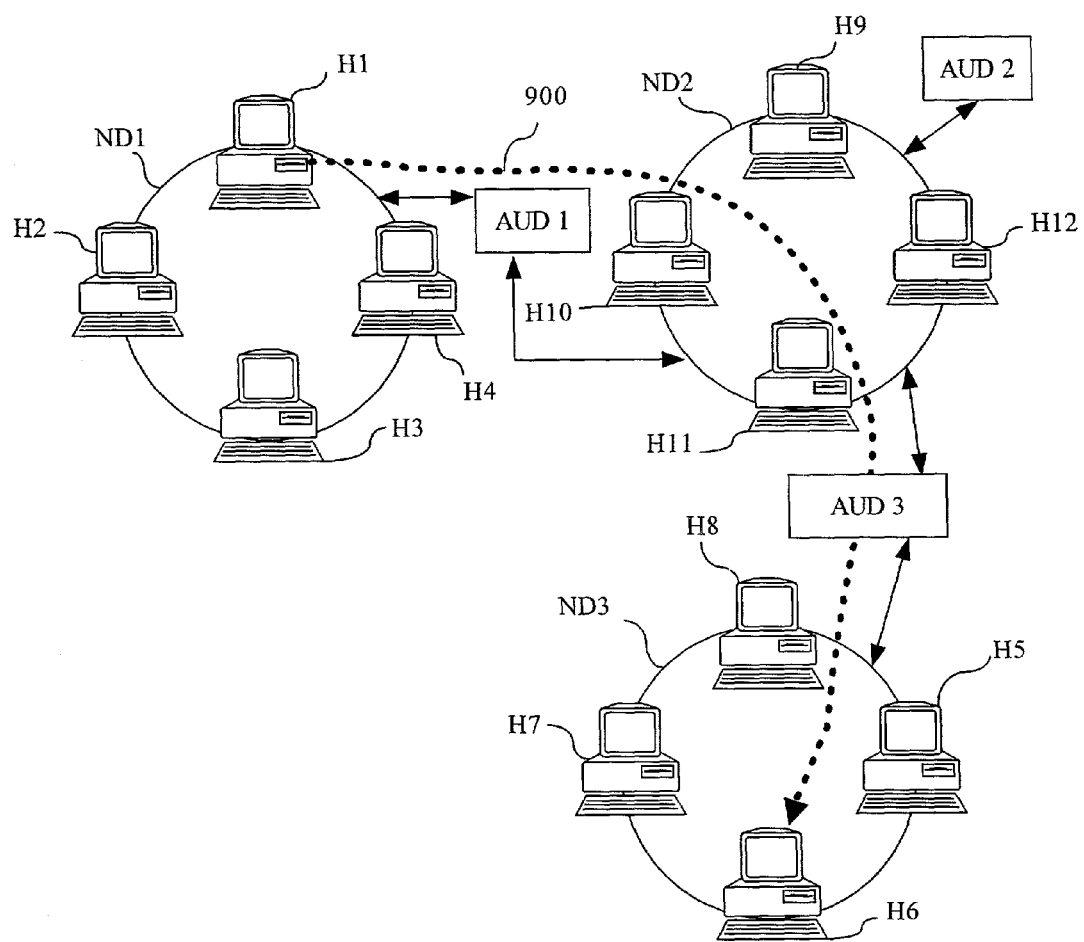
FIG. 10 illustrates an example of how a packet can move from one enclave to another, traveling across noise domains, in accordance with the subject invention.

An illustrative scenario is shown in FIG. 10. Here, during a packet's travel (represented by the dashed line 900) between domain and AUD 3, AUD 3 receives the packet from AUD 2. When the packet comes in, AUD 3 decrypts it as in the above-mentioned receive scenario. AUD 3 determines that the packet belongs inside its domain since the subnet broadcast address matches its subnet. AUD 3 then behaves like any other host in domain AUD 3 and performs a send operation to place the packet in the noise domain, to be received by the (local) recipient. Thus, the local AUD router receives a broadcast datagram header with an obfuscated datagram. (i.e., tunneled datagram) and retunnels the datagram into its own local domain. Tunneling is therefore performed at every step of the way. This is useful for the case when someone is sniffing the local domain. Advantageously, there is no concept of trusted network subnets or domains. It is assumed that all network segments leading up to and touching the individual hosts are possibly hostile. FIG. 8 is a flowchart showing a steady state operation 700 in accordance with the present invention. This scenario describes how hosts behave when not involved in sending or receiving specific packets. There are two modes of operation, nave mode 730, in which no extra traffic is emitted, and paranoid mode 705, in which spurious traffic is emitted.

In naïve mode 730, the host(s) checks for new packets, as shown in step 735 and if step 740 determines that a packet is being received, then conventional packet processing is performed, as shown in step 745. That is, when the host is not receiving or sending a packet no action is taken, resulting in a "quiet wire" condition. Notably, naïve mode 730 may lead to detection of a responder, based on characteristics of the reply latency, etc. A quite wire situation is when traffic is only transmitted when there is a legitimate cause for traffic to be sent. In other words, there is no noise as in the paranoid mode; every packet is being used for something. Thus when traffic is being observed, one could theoretically know there is a cause for transmittal. An adversary could watch a series requests and replies, and eventually conclude which machine was requesting and which was replying, the number of parties requesting and replying, and so on. From that information, the adversary could perform external stimulus attacks, e.g., flood a host and determine whether the request/reply pattern changes. Similarly, the host conventionally receives or sends a packet.

In paranoid mode 705, the host(s) checks for new packets, as shown in step 710. If step 715 determines that a packet is not being received, then it periodically emits traffic whether or not the host is replying to something, as shown in step 725. Conventional packet processing is performed otherwise, as shown in step 720. The purpose of paranoid mode is to defeat traffic frequency analysis and critical event/stimulus analysis. This can be done on a timing chain mode of operation. Traffic is generated to approximate a pipe-full condition at the cost of bandwidth efficiency. In this mode, as opposed to naïve mode, there is spurious traffic and chatty line. An attempt to extract messages from a line implementing the present invention in the paranoid mode would appear to be listening to multiple machines. The real messages, however, are hidden in that noise, such that it is hard to pick out the actual messages from the noise, and difficult to tell if any actual (i.e., meaningful) messages are being sent.

Proxy mode in accordance with the present invention will now be described. A proxy mode enables an AUD router to talk to a non-AUD enabled device such as an Internet web server. A recipient is determined to be non-AUD capable if no entry in an AUD routing table exists. That is, only AUD-enabled enclaves and hosts are contained in routing tables (along with their keys). A standard, network address translation style (NAT-style) connection is established with the recipient host, terminated at the AUD router. As AUD packets enter in from the host, the AUD router receives them as described above, and creates NAT-style datagrams for forwarding to the outside. Replies from the non-AUD host are handled in standard NAT-style.

Figure 9:
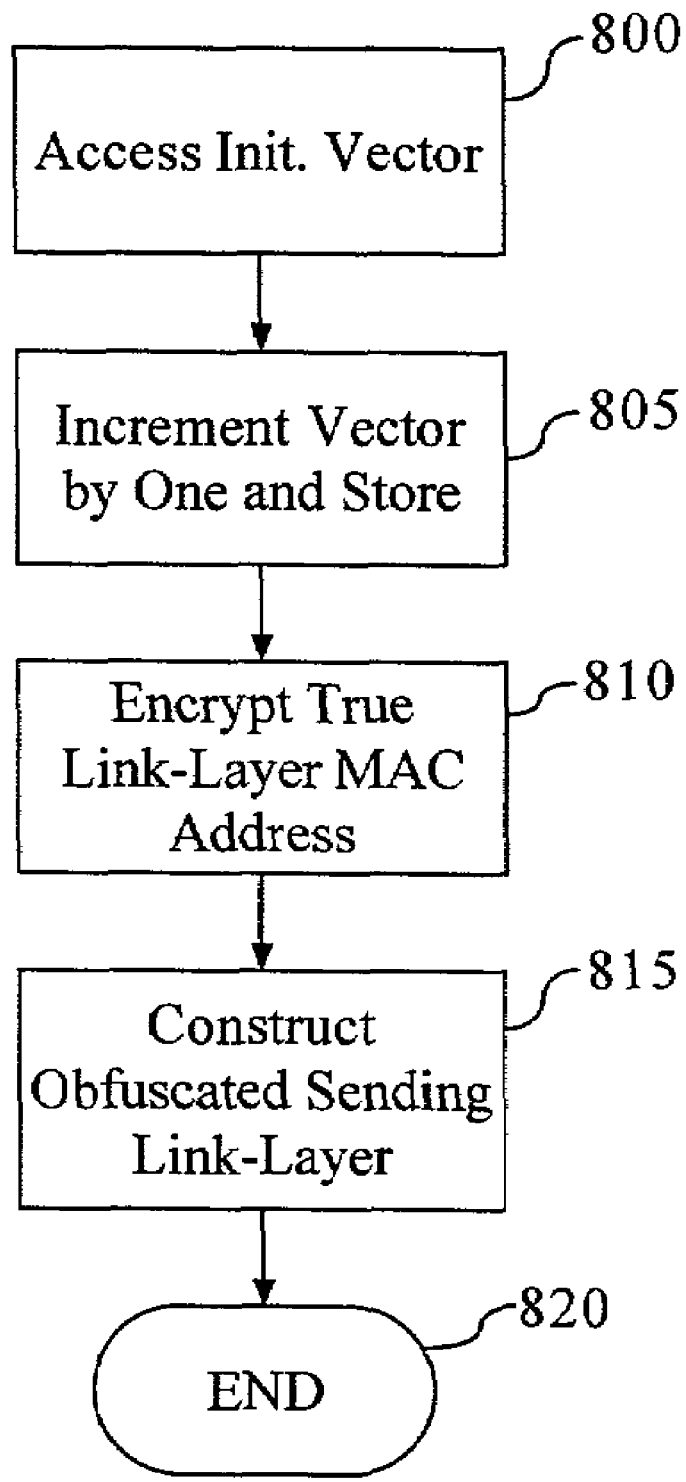
FIG. 9 is a flowchart showing the steps for constructing and sending a link-layer source address in accordance with the subject invention.

The link-layer source address specification will now be described with reference to FIG. 9. In order to reasonably hide the sender from being discovered, the link-layer source address is made as untraceable to the sender as possible. This process involves replacing the true link-layer sender address with a contrived one. By following these steps, the sender of the packet is concealed from passive wiretappers (e.g., those adversaries with hardware connected to common hubs, switches, or the like). First, in step 800, the sender accesses its stored initialization vector. The sender then increments the vector by one and stores the result, shown at step 805. Should the vector reach its maximum value (determined by the number of bits), it will be reset to zero rather than be incremented. With the incremented initialization vector value, the sender encrypts its true link-layer MAC address, as shown at step 810. The encryption algorithm can be a symmetric cipher of appropriate strength, or the like. Next, at step 815, the sender constructs an obfuscated sending link-layer address using portions of the encrypted link-layer address from step 810 and by combining it with special reserved codes to create a custom link-layer address.

In the case of Ethernet, the obfuscated link-layer address may be constructed in the following manner. Ethernet is a 6-octet, or 48 bit, address. The top three octets are set to the vendor code as per a designation list maintained in a database or on a server. Preferably all the vendors' link-layer software implementing AUD use a common vendor code for the sender address, so that the adversary will not be able to distinguish the sender based on the brand of their network card/software. The bottom three octets are the bottom bytes of the encrypted link-layer address. Next, the Ethernet frame is constructed with the destination address set to "broadcast", and the source address set to this unique value.

Note that with only twenty-four unique bits to work with, different keys in use, and different initialization vectors, there may be "recipient collisions" of addresses. A recipient collision would occur if two hosts simultaneously chose the same sender address for frames.

As described above with regard to receiving a packet, if a sender recognizes a source address as its own, it may drop the packet. This may seem problematic for the true, intended recipient if a collision is occurring (i.e., if the true recipient's sending address matches the destination address). The recipient involved in the collision will discard the packet. If this should happen, then upper-layer protocols would detect that the host did not receive the packet, causing the packet to be re-sent. The chances of a collision occurring again would be much less. It would be as if a momentary network outage had occurred.

Note that the AUD technique can be used over a unique link-layer protocol that omits the sender link-layer address.

A local AUD collision domain is defined to be a group of AUD-aware apparatus connected to a common link-layer collision domain, and one of these apparatus is be an AUD-aware router that is capable of forwarding AUD-tunneled datagrams to other AUD-aware routers and receiving AUD-tunneled datagrams from other routers.

A back-to-back arrangement of default AUD routers chaining together a series of adjacent collision domains within a local network may be used, but a router-to-router topology is more flexible and is preferred. The recipient subnet is used to construct the broadcast header (i.e., that of the enclosing datagram). If the AUD default router is in the local collision domain, perfect anonymity is achieved. If however, the AUD default router is in a different link-layer collision domain, a traffic analyst may be able to determine a communication linkage between these two, logically separated subnetworks. This represents a tradeoff between anonymity and operational versatility.

Two AUD routers may be employed simultaneously. In addition to an AUD router inside a network, an additional AUD router at the border, for use in enclave-internet-enclave communications, may be installed. This allows for the creation of a single tunnel between enclaves. For example, multiple AUD domains can be fed into one border AUD router which is connected to the Internet, resulting in one AUD tunnel going over the Internet. Without this border router, an adversary would see multiple individual AUD tunnels going over the Internet. Accordingly, using the border router makes it still more difficult to correlate traffic.

With regard to proxying, preferably the enclave border AUD router handles all proxying for the enclave. By pushing proxying up to the edge of the network, maximum obfuscation of the identity of the host is achieved.

FIG. 10 depicts an example of how a packet can move from one AUD enclave to another, traveling across noise domains ND1, ND2 and ND3. In this example, the path 900 of a packet is from host H1 to host H6. A noise domain is a collision domain in which AUD traffic is sent and received anonymously, and in which many of the hosts often communicate, emitting false as well as real data to simulate a pipe-full condition. In this way, packets can travel from sender to receiver and maintain full anonymity except at the receiving end-points (and AUD routers).

An example of a message transmission from host H1 (e.g., address 128.11.33.100) to host H6 (e.g., address 207.123.169.5) will now be described. The AUD processing features of H1 receive an IP datagram (i.e., original IP datagram) from H1's system software. It looks at the datagram, and first determines that H6 is not in its local domain, an consequently chooses a next-hop address of the router AUD 1. From this next-hop address, H1 creates the next hop unique identifier and puts this in the IP options field of the original IP datagram. H1 encrypts portions of the original IP datagram and then creates an encapsulating IP header and sets the destination address to AUD's broadcast address (i.e., 128.11.33.255), sets the source to some random value X (i.e., 128.11.33.X), and sends the message onto the wire. (It should be noted that this example could easily have been implemented using Ethernet protocols and still be within the scope of the invention. The IP suite of protocols is merely being used for illustrative purposes.)

AUD 1 receives the tunneled datagram (as do all of the hosts). AUD 1 then decrypts the tunneled packet, examines the destination subnet on the encapsulating header (i.e., 128.11.33.X), and decrypts the unique next hop identifier out of the encapsulated IP options field, and sees that it is the next hop. Next, based on routing tables AUD 1 determines in order to get to H6, the next hop must be AUD 2. A similar retunneling operation is performed, the next hop becomes AUD 2, and the packet is admitted into ND2. The message is then received by AUD 2, and similarly next-hopped to AUD 3.

AUD 3 determines that the destination IP address (the destination on the inner, encapsulated datagram) is in its domain, and next-hops the message to H6. H6 receives it, and at this point, the unique next hop identifier should equal H6, and should match the true IP address in the encapsulated datagram. H6 detunnels and decapsulates the original IP datagram, and forwards this datagram up into its operating software for proper handling.

As an alternative to enclave-to-enclave AUD, network administrators may choose to implement IPsec or some other tunneling scheme between AUD routers. Though this has several advantages, the primary disadvantage is that the traffic analyzer can correlate communicating subnets, which may give useful information to an adversary. The use of noise-domain tunneling may thwart knowledge of which subnets are communicating.

The use of AUD overcomes some of the problems with the previous per-packet and other variants on DYNAT, and gains many benefits. The AUD technique allows the DYNAT address obfuscation technique to be deployed in "the last hop" of the network—in the local host collision domain (i.e., last-hop deployability). The AUD technique is also firewall-friendly. Since the DYNAT packets are being tunneled using IP-in-IP encapsulation, firewalls can be configured to accept the broadcast IP-in-IP packets while rejecting other packets. The firewall would not have to look at the address or the port of the encapsulated datagram.

The AUD technique also layers well with additional security techniques, including IPsec and SSL, which protect packet payloads hypertext transfer protocol (HTTP), file transfer protocol (FTP), and the like) from analysis. The AUD technique according to the present invention protects sender/recipient identities. Along with the AUD technique, tunneling technologies can be used to protect packet headers sent into the local AUD domain such that the destination address is hidden when the AUD router receives it. Tunneling techniques may include per-packet DYNAT, ASD, IPsec, or other encipherment techniques.

Another advantage of the AUD technique is that it is impervious to fragmentation. A common problem with encapsulating techniques such as IPsec is that fragmentation of the IP datagram often results in undecipherable fragments. The AUD technique functions only on the header portions of the packet, and would not incur fragmentation/decryption problems.

Yet another advantage of the present invention is that it has application-layer independence. Since the AUD technique only operates on the link, network, and transport layers of the protocol stack, networks need no special application-specific proxies.

Another advantage of the AUD technique is that it can protect host-level identities, negating a wide-range of address/port-based attacks, enabling special intrusion detectors to be used.

It should also be noted that while the invention has been described above in the context being implemented as a host card or software modification to a router, the invention is not limited as such. For example, the present invention can also be implemented as software or hardware modifications to a computer, bastion host, firewall, NAT, Bridge, Switch, Gateway, VPN device, transceiver, mobile communications device, satellite and the like. Accordingly, the teaching of this invention can be applied to any type of network communications device or system using addressing techniques to route to a network device.

More generally, the invention has been particularly shown and described with respect to preferred embodiments thereof, it will be understood by those skilled in the art that changes in form and details may be made therein without departing from the scope and spirit of the invention.

Having described the invention, what is claimed as new and secured by Letters Patent is:

1. A computer-implemented method for concealing the identity of a network device transmitting a datagram having a network layer header, comprising:
   determining, by operation of a computer, a unique next-hop identifier in accordance with a next-hop address that identifies a next-hop that the datagram will visit;
   generating, by operation of said computer, a broadcast address in accordance with the next-hop address;
   creating, by operation of said computer, a partially encrypted network layer header by encrypting a plurality of identifying portions of the network layer header, wherein one portion of the network layer header is the unique next-hop identifier; and
   encapsulating, by operation of said computer, the datagram with another network layer header whose address is set to the broadcast address.

2. A method according to claim 1, further comprising:
   receiving and detunneling, by operation of said computer, the encapsulated datagram;
   extracting, by operation of said computer, an address of a recipient from the network layer header; and
   admitting, by operation of said computer, the datagram into a network domain.

3. A method according to claim 1, further comprising:
   storing, by operation of said computer, at least one subnet address, a host machine address, an encryption key corresponding to a network interface of a router connected to a local domain, a plurality of host encryption keys for a plurality of other hosts in the local domain, and a router address of the router, wherein the router has stored in a table the plurality of keys indexed by a plurality of addresses corresponding to the other hosts and the address of the host machine;
   creating, by operation of said computer, at least one unique initialization vector for each host in the local domain and the router in accordance with the unique local identifier; and
   distributing, by operation of said computer, each initialization vector to each host in the local domain.

4. A method according to claim 1, further comprising:
setting, by operation of said computer, the next-hop address to an address of a recipient when the recipient host subnet matches a sending host subnet; and
consulting, by operation of said computer, a routing table to find an address corresponding to the recipient host subnet when the recipient host subnet does not match the sending host subnet and setting the next-hop address to the found address.

5. A method according to claim 1, further comprising:
setting, by operation of said computer, the next-hop address to a multicast address.

6. A method according to claim 1, further comprising:
creating, by operation of said computer, a link-layer frame containing the encapsulated datagram, wherein when the next-hop address matches a sending host subnet, the destination link-layer address is set to a link-layer broadcast value and a source link-layer address is chosen per a link-layer addressing description, wherein when the next-hop address does not equal the sending host subnet, a conventional link-layer processing is performed to cross a link-layer collision boundary; and
transmitting, by operation of said computer, the link-layer frame with the encapsulated datagram.

7. A method according to claim 6, further comprising:
transmitting, by operation of said computer, on a time-controlled basis.

8. A method according to claim 6, further comprising:
receiving, by operation of said computer, the link-layer frame with the encapsulated datagram;
discarding and/or ignoring, by operation of said computer, the received link-layer frame;
decrypting, by operation of said computer, the identifying portions and the unique next-hop identifier of the partially encrypted network layer header; and
determining, by operation of said computer, whether the datagram is intended for a receiving network device.

9. A method according to claim 8, further comprising:
determining, by operation of said computer, whether the destination address matches the receiving machine's address; and
determining, by operation of said computer, whether the decrypted unique next-hop identifier matches the receiving machine's unique next-hop identifier.

10. A method according to claim 8, further comprising:
dropping, by operation of said computer, the datagram if determined in the determining step that the datagram is not intended for the receiving network device; and
processing, by operation of said computer, the datagram if determined in the determining step that the datagram is intended for the receiving network device.

11. A method according to claim 1, further comprising:
periodically emitting, by operation of said computer, spurious traffic.

12. A method according to claim 1, further comprising:
determining, by operation of said computer, an encryption key; and
encrypting, by operation of said computer, the plurality of identifying portions of the network layer header in accordance with the encryption key.

13. An apparatus for concealing the identity of a network device transmitting a datagram having a network layer header, comprising:
a processor including processing circuitry configured to determine a unique next-hop identifier in accordance with a next-hop address that identifies a next-hop that the datagram will visit,
generate a broadcast address in accordance with the next-hop address,
create a partially encrypted network layer header by encrypting a plurality of identifying portions of the network layer header, wherein one portion of the network layer header is the unique next-hop identifier, and
encapsulate the datagram with another network layer header whose address is set to the broadcast address.

14. An apparatus according to claim 13, further comprising:
a memory adapted to store at least one subnet address; a host machine address, an encryption key corresponding to a network interface of a router connected to a local domain, a plurality of host encryption keys for a plurality of other hosts in the local domain, and a router address of the router, wherein the router has stored in a table the plurality of keys indexed by a plurality of addresses corresponding to the other hosts and the address of the host machine,
wherein said processor is further adapted to create at least one unique initialization vector for each host in the local domain and the router in accordance with the unique local identifier, and to distribute each initialization vector to each host in the local domain.

15. An apparatus according to claim 13, wherein said processor is further adapted to set the next-hop address to an address of a recipient when the recipient host subnet matches a sending host subnet, and to consult a routing table to find an address corresponding to the recipient host subnet when the recipient host subnet does not match the sending host subnet and set the next-hop address to the found address.

16. An apparatus according to claim 13, wherein said processor is further adapted to set the next-hop address to a multicast address.

17. An apparatus according to claim 13, further comprising:
a transceiver adapted to transmit a link-layer frame with the encapsulated datagram,
wherein said processor is further adapted to create the link-layer frame containing the encapsulated datagram, wherein when the next-hop address matches a sending host subnet, the destination link-layer address is set to a link-layer broadcast value and a source link-layer address is chosen per a link-layer addressing description, wherein when the next-hop address does not equal the sending host subnet, a conventional link-layer processing is performed to cross a link-layer collision boundary.

18. An apparatus according to claim 17, wherein transmission of the link-layer frame with the encapsulated datagram occurs on a time-controlled basis.

19. An apparatus according to claim 17, wherein said transceiver is further adapted to receive the link-layer frame with the encapsulated datagram, and said processor is further adapted to discard and/or ignore the received link-layer frame, decrypt the identifying portions and the unique next-hop identifier of the partially encrypted network layer header, and determine whether the datagram is intended for a receiving network device.

20. An apparatus according to claim 19, wherein said processor is further adapted to determine whether the destination address matches the receiving machine's address, and
determine whether the decrypted unique next-hop identifier matches the receiving machine's unique next-hop identifier.

21. An apparatus according to claim 19, wherein said processor is further adapted to drop the datagram if determined that the datagram is not intended for a predetermined host, and process the datagram if the datagram is intended for the predetermined host.

22. An apparatus according to claim 13, wherein said processor is further adapted to periodically emit spurious traffic via said transceiver.

23. An apparatus according to claim 13, wherein said processor is further adapted to determine an encryption key, and encrypt the plurality of identifying portions of the network layer header in accordance with the encryption key.

24. An apparatus for forwarding a datagram having a network layer header, comprising:
 a transceiver adapted to receive an encapsulated datagram from a network device;
 a processor including processing circuitry configured to detunnel the encapsulated datagram, extract an address from the network layer header, and admit the datagram into a network domain,
 wherein the network device is adapted to determine a unique next-hop identifier in accordance with a next-hop address that identifies a next-hop that the datagram will visit, generate a broadcast address in accordance with the next-hop address, create a partially encrypted network layer header by encrypting a plurality of identifying portions of the network layer header, wherein one portion of the network layer header is the unique next-hop identifier, encapsulate the datagram with another network layer header whose address is set to the broadcast address, and transmit the encapsulated datagram.

25. A machine-readable medium having stored thereon a computer program, for concealing the identity of a network device transmitting a datagram having a network layer header, operable to:
 determine a unique next-hop identifier in accordance with a next-hop address;
 generate a broadcast address in accordance with the next-hop address that identifies a next-hop that the datagram will visit;
 create a partially encrypted network layer header by encrypting a plurality of identifying portions of the network layer header, wherein one portion of the network layer header is the unique next-hop identifier; and
 encapsulate the datagram with another network layer header whose address is set to the broadcast address.

26. A machine-readable medium according to claim 25, wherein the computer program is further operable to:
 store at least one subnet address, a host machine address, an encryption key corresponding to a network interface of a router connected to a local domain, a plurality of host encryption keys for a plurality of other hosts in the local domain, and a router address of the router, wherein the router has stored in a table the plurality of keys indexed by a plurality of addresses corresponding to the other hosts and the address of the host machine;
 create at least one unique initialization vector for each host in the local domain and the router in accordance with the unique next-hop identifier; and
 distribute each initialization vector to each host in the local domain.

27. A machine-readable medium according to claim 25, wherein the computer program is further operable to:
 set the next-hop address to an address of a recipient when the recipient host subnet matches a sending host subnet; and
 consult a routing table to find an address corresponding to the recipient host subnet when the recipient host subnet does not match the sending host subnet and setting the next-hop address to the found address.

28. A machine-readable medium according to claim 25, wherein the computer program is further operable to:
 set the next-hop address to a multicast address.

29. A machine-readable medium according to claim 25, wherein the computer program is further operable to:
 create a link-layer frame containing the encapsulated datagram, wherein when the next-hop address matches a sending host subnet, the destination link-layer address is set to a link-layer broadcast value and a source link-layer address is chosen per a link-layer addressing description, wherein when the next-hop address does not equal the sending host subnet, a conventional link-layer processing is performed to cross a link-layer collision boundary; and
 transmit the link-layer frame with the encapsulated datagram.

30. A machine-readable medium according to claim 29, wherein the computer program is further operable to:
 transmit on a time-controlled basis.

31. A machine-readable medium according to claim 29, wherein the computer program is further operable to:
 receive the link-layer frame with the encapsulated datagram;
 discard and/or ignoring the received link-layer frame;
 decrypt the identifying portions and the unique local identifier of the partially encrypted network layer header; and
 determine whether the datagram is intended for a receiving network device.

32. A machine-readable medium according to claim 31, wherein the computer program is further operable to:
 determine whether the destination address matches the receiving machine's address; and
 determine whether the decrypted unique next-hop identifier matches the receiving machine's unique next-hop identifier.

33. A machine-readable medium according to claim 31, wherein the computer program is further operable to:
 drop the datagram if determined that the datagram is not intended for the receiving network device;
 process the datagram if determined that the datagram is intended for the receiving network device.

34. A machine-readable medium according to claim 25, wherein the computer program is further operable to:
 periodically emit spurious traffic.

35. A machine-readable medium according to claim 25, wherein the computer program is further operable to:
 determine an encryption key; and
 encrypt the plurality of identifying portions of the network layer header in accordance with the encryption key.

36. A machine-readable medium having stored thereon a computer program, for forwarding a datagram having a network layer header, operable to:
 receive and detunnel an encapsulated datagram from a transceiver;
 extract an address from the network layer header; and
 admit the datagram into a network domain,
 wherein the transceiver is adapted to determine a unique next-hop identifier in accordance with a next-hop address that identifies a next-hop that the datagram will visit, generate a broadcast address in accordance with the next-hop address, create a partially encrypted network layer header by encrypting a plurality of identifying portions of the network layer header, wherein one portion of the network layer header is the unique next-hop identifier, encapsulate the datagram with another network layer header whose address is set to the broadcast address, and transmit the encapsulated datagram.

37. An apparatus for concealing the identity of a network device transmitting a datagram having a network layer header, comprising:
   means for determining a unique next-hop identifier in accordance with a next-hop address that identifies a next-hop that the datagram will visit;
   means for generating a broadcast address in accordance with the next-hop address;
   means for creating a partially encrypted network layer header by encrypting a plurality of identifying portions of the network layer header, wherein one portion of the network layer header is the unique next-hop identifier; and
   means for encapsulating the datagram with another network layer header whose address is set to the broadcast address.

38. An apparatus according to claim 37, further comprising:
   means for storing at least one subnet address, a host machine address, an encryption key corresponding to a network interface of a router connected to a local domain, a plurality of host encryption keys for a plurality of other hosts in the local domain, and a router address of the router, wherein the router has stored in a table the plurality of keys indexed by a plurality of addresses corresponding to the other hosts and the address of the host machine;
   means for creating at least one unique initialization vector for each host in the local domain and the router in accordance with the unique next-hop identifier; and
   means for distributing each initialization vector to each host in the local domain.

39. An apparatus according to claim 37, further comprising:
   means for setting the next-hop address to an address of a recipient when the recipient host subnet matches a sending host subnet;
   means for consulting a routing table to find an address corresponding to the recipient host subnet when the recipient host subnet does not match the sending host subnet; and
   means for setting the next-hop address to the found address.

40. An apparatus according to claim 37, further comprising:
   means for setting the next-hop address to a multicast address.

41. An apparatus according to claim 37, further comprising:
   means for creating a link-layer frame containing the encapsulated datagram, wherein when the next-hop address matches a sending host subnet, the destination link-layer address is set to a link-layer broadcast value and a source link-layer address is chosen per a link-layer addressing description, wherein when the next-hop address does not equal the sending host subnet, a conventional link-layer processing is performed to cross a link-layer collision boundary; and
   means for transmitting the link-layer frame with the encapsulated datagram.

42. An apparatus according to claim 41, further comprising:
   means for transmitting on a time-controlled basis.

43. An apparatus according to claim 41, further comprising:
   means for receiving the link-layer frame with the encapsulated datagram;
   means for discarding and/or ignoring the received link-layer frame;
   means for decrypting the identifying portions and the unique next-hop identifier of the partially encrypted network layer header; and
   means for determining whether the datagram is intended for a receiving network device.

44. An apparatus according to claim 43, further comprising:
   means for determining whether the destination address matches the receiving machine's address; and
   means for determining whether the decrypted unique next-hop identifier matches the receiving machine's unique next-hop identifier.

45. An apparatus according to claim 43, further comprising:
   means for dropping the datagram if determined that the datagram is not intended for the receiving network device; and
   means for processing the datagram if determined that the datagram is intended for the receiving network device.

46. An apparatus according to claim 37, further comprising:
   means for periodically emitting spurious traffic.

47. An apparatus according to claim 37, further comprising:
   means for determining an encryption key; and
   means for encrypting the plurality of identifying portions of the network layer header in accordance with the encryption key.

48. An apparatus for forwarding a datagram having a network layer header, comprising:
   means for receiving an encapsulated datagram from a network device;
   means for detunneling the encapsulated datagram;
   means for extracting an address from the network layer header; and
   means for admitting the datagram into a network domain, wherein the network device is adapted to determine a unique next-hop identifier in accordance with a next-hop address that identifies a next-hop that the datagram will visit, generate a broadcast address in accordance with the next-hop address, create a partially encrypted network layer header by encrypting a plurality of identifying portions of the network layer header, wherein one portion of the network layer header is the unique next-hop identifier, encapsulate the datagram with another network layer header whose address is set to the broadcast address, and transmit the encapsulated datagram.

49. A system for concealing the identity of a network device transmitting a datagram having a network layer header, comprising:
   a first processor adapted to determine a unique next-hop identifier in accordance with a next-hop address, generate a broadcast address in accordance with the next-hop address that identifies a next-hop that the datagram will visit, create a partially encrypted network layer header by encrypting a plurality of identifying portions of the network layer header, wherein one portion of the network layer header is the unique next-hop identifier, and encapsulate the datagram with another network layer header whose address is set to the broadcast address;

a first transceiver electrically coupled to said first processor for transmitting and receiving the encapsulated datagram; and a second transceiver adapted to receive the encapsulated datagram, a second processor, electrically coupled to said second transceiver, adapted to detunnel the encapsulated datagram, extract an address from the network layer header, and admit the datagram into a network domain via the second transceiver.

* * * * *